United States Patent
Lounis et al.

(10) Patent No.: US 10,103,615 B2
(45) Date of Patent: Oct. 16, 2018

(54) EDDY CURRENT RETARDER EQUIPMENT

(71) Applicant: TELMA, Saint Ouen l'Aumone (FR)

(72) Inventors: Rafik Lounis, Pontoise (FR); Mickael Martin, Montreuil (FR); Nicolas Quennet, Cormeilles en Parisis (FR)

(73) Assignee: TELMA, Saint Ouen l'Aumone (FR)

( * ) Notice: Subject to any disclaimer, the term of this patent is extended or adjusted under 35 U.S.C. 154(b) by 451 days.

(21) Appl. No.: 14/898,001

(22) PCT Filed: Jun. 19, 2014

(86) PCT No.: PCT/FR2014/051523
§ 371 (c)(1),
(2) Date: Dec. 11, 2015

(87) PCT Pub. No.: WO2014/202908
PCT Pub. Date: Dec. 24, 2014

(65) Prior Publication Data
US 2016/0141947 A1     May 19, 2016

(30) Foreign Application Priority Data
Jun. 20, 2013 (FR) ...................... 13 55859

(51) Int. Cl.
*H02K 49/04*    (2006.01)
*B60L 7/28*    (2006.01)
(Continued)

(52) U.S. Cl.
CPC .............. *H02K 49/046* (2013.01); *B60L 7/28* (2013.01); *H02P 29/0022* (2013.01); *H02P 29/662* (2016.11)

(58) Field of Classification Search
CPC .................................................... H02K 49/046
(Continued)

(56) References Cited

U.S. PATENT DOCUMENTS

| 5,482,146 A | 1/1996 | Estaque et al. |
| 5,485,901 A | 1/1996 | Akima et al. |

(Continued)

FOREIGN PATENT DOCUMENTS

| CN | 102540960 | 7/2012 |
| EP | 0 466 941 | 1/1992 |

(Continued)

OTHER PUBLICATIONS

FR search report, dated May 12, 2014; Application No. 1355859.
International search report, dated Sep. 8, 2014; Application No. PCT/FR2014/051523.

*Primary Examiner* — David S Luo
(74) *Attorney, Agent, or Firm* — Young & Thompson

(57) ABSTRACT

Eddy current retarder equipment (1) able to be carried on board a vehicle, includes: a stator assembly (2), including inductor windings (23) forming a circuit (4), a rotor assembly (3) designed to be mounted on a transmission shaft of the vehicle, including an armature (31) facing the inductor windings (23), control elements (6) for establishing a linear setpoint ($\beta$), excitation elements (7) for exciting the inductor circuit (4) from an electric power source (5) of the vehicle as a function of the setpoint ($\beta$), a speed sensor (9) for supplying information relating to the rotational speed ($\Omega$) of the rotor assembly (3), a sensor (10) of the strength of current supplied to the inductor circuit (4), processing elements (8) for estimating, at a given moment (t), the retarding torque supplied by the equipment (1).

19 Claims, 3 Drawing Sheets

(51) Int. Cl.
*H02P 29/00* (2016.01)
*H02P 29/66* (2016.01)

(58) Field of Classification Search
USPC .............................................. 318/87, 86, 34
See application file for complete search history.

(56) References Cited

U.S. PATENT DOCUMENTS 5,490,584 A  2/1996  Estaque et al.
6,485,111 B2 * 11/2002 Suo ........................... B60L 7/28
                                                          188/158

FOREIGN PATENT DOCUMENTS

| EP | 0 603 038 | 6/1994 |
| EP | 0 660 502 | 6/1995 |
| JP | 2008-054451 | 3/2008 |

* cited by examiner

EDDY CURRENT RETARDER EQUIPMENT

The invention relates to the field of electromagnetic retarders for vehicles, and more particularly to devices for measuring the braking torque generated by such a retarder.

Electromagnetic retarders are devices making it possible to supplement the braking systems of vehicles of any type, and in particular of land motor vehicles, such as trains, heavy goods vehicles or commercial vehicles, for which they are particularly advantageous.

In fact, at the time of braking, referred to as service braking of heavy load vehicles, due to their great inertia, the energy to be dissipated in order to slow down or even stop the vehicle with a conventional braking system is so great that the elements of the braking system, and in particular the brake pads, experience heating resulting in premature wear.

Magnetic retarders were thus developed in order to obtain an endurance braking, i.e. to slow down the vehicle while dissipating a large part of the braking energy, thus relieving the conventional braking system.

An electromagnetic retarder makes it possible to dissipate the energy by generating eddy currents. To this end, the retarder generally comprises a stator, fixed for example to the frame of the vehicle, and a rotor, mounted for example on a transmission shaft which drives it in rotation. The stator and the rotor are mounted coaxially, opposite to one another, a space referred to as an air gap being arranged between them, one of them acting as the inductor of a magnetic field, the other acting as the induced. The stator can be associated with one or more rotors, placed for example on either side of the stator according to their axial direction.

In general, the stator acts as the inductor and typically comprises an electromagnet which generates a magnetic field when an electric current passes through it. The electromagnet is typically obtained by placing coils in pairs perpendicular to the axis of the transmission shaft. The rotor comprises a conductive element called the armature, through which eddy currents pass when it is subjected to the magnetic field generated by the stator and driven in rotation by the transmission shaft. Forces, called Laplace forces, thus appear and counteract the rotation of the rotor. The braking torque thus generated and applied to the transmission shaft makes it possible to slow down the vehicle. The energy generated by the Laplace forces is dissipated in the form of heat.

Obtaining information on the actual braking torque is of particular interest, because it contributes to establishing an effective management of the various braking resources of the vehicle. For example, they make it possible to determine the performance of the retarder and to deduce potential defects therefrom. Maintenance measures can thus be taken before irreparable damage is caused. Information on the actual braking torque also makes it possible to know the difference between a theoretical torque, corresponding to the braking torque expected as a function of a setting, and the actual torque, in order to optionally correct the supply voltage of the coils as a function of the difference.

The temperature of the armature has a significant impact on the braking torque. In fact, at equal exciting current of the coils, the higher the temperature of the armature, the lower the value of the braking torque. Determining the temperature of the armature thus makes it possible to obtain information on the braking performance of the retarder. However, the armature is in general carried by the rotor, in such a way that a temperature sensor cannot be in direct contact with the armature, without setting up a complex and thus costly assembly.

Document EP 0 603 038 proposes a method for indirectly obtaining the temperature of the armature at a given time by a successive approach starting from an initial temperature of the armature. The calculation takes into account various factors determined by means of tests for each retarder, the rotational speed of the rotor and a supply setting of the coils. When the temperature of the rotor thus calculated exceeds a predetermined maximum value, the supply setting of the coils is adjusted accordingly.

However, this method does not make it possible to obtain a value of the braking torque of the retarder.

Document EP 0 660 502 thus proposes to calculate the retarding torque, at a given time, as a function in particular of the rotational speed of the rotor and of the temperature of the rotor calculated by means of the successive approach of document EP 0 603 038, and of the setting.

The calculation of the retarding torque is carried out in the case of document EP 0 660 502 for a retarder with five performance levels: the first level, or level zero, being when the retarder is not operating, i.e. none of the coils are supplied, and the final level, or level four, being when all the coils are supplied, for a maximum braking torque. A control device controls the supply of four pairs of coils, or four inductor assemblies via four electromagnetic relays called contactors. Depending on the braking torque requirement, for example calculated by means of the onboard electronics of the vehicle as a function of the position of a manual control unit with five positions, the control device will calculate the position and/or the number of contactors to be activated in order to satisfy the requirement. In other words, the setting can only take five values, as a function of the number of supplied coils.

The change to a linear control of the retarder revealed that when the torque is calculated according to the method of the state of the art, the difference with the actual torque is too great for it to be acceptable. The errors between the calculated torque and the actual torque in the calculation of the torque will accumulate, and for extended vehicle usage, the braking quality deteriorates therefrom, the retarder no longer being able to provide optimum braking.

A need therefore exists for novel eddy current retarder equipment, in which the control is linear, making it possible to obtain a torque calculated with greater accuracy.

To this end, the invention proposes, according to a first aspect, eddy current retarder equipment capable of being carried on board a vehicle, and comprising:
  a stator assembly,
  a rotor assembly, capable of being mounted on a transmission shaft of the vehicle.

One of said stator assembly and rotor assembly comprises inductor windings forming an inductor circuit and the other of said stator assembly and rotor assembly comprises an armature facing the inductor windings.

The equipment also comprises:
  control means for establishing a linear setting,
  excitation means for exciting the inductor circuit from an electric power source of the vehicle as a function of the setting,
  a speed sensor for providing information relating to the rotational speed of the rotor assembly,
  a sensor of the strength of current supplying the inductor circuit,
  processing means for estimating, at a given time, the retarding torque provided by the equipment.

The processing means comprise a unit for calculating temperature capable of evaluating the temperature of the armature, as a function in particular of the rotational speed of the rotor assembly and the linear setting.

The processing means further comprise:

a torque calculation unit for calculating a torque referred to as cold, as a function in particular of the current in the inductor circuit and the rotational speed of the rotor assembly, characteristic of an operation of the equipment without the influence of temperature;

a unit for calculating a reduction factor, as a function in particular of the rotational speed of the rotor assembly and the temperature of the armature, characteristic of the influence of temperature on the operation of the equipment;

a unit for calculating a torque referred to as hot, as a function in particular of the product of the cold torque and the reduction factor, characteristic of the actual retarding torque provided by the equipment.

The equipment can thus calculate the braking torque with greater accuracy.

The control means can comprise a manual or foot control unit, capable of adopting an infinity of positions between two extreme positions.

Furthermore, for example, the control means comprise an electronic control unit.

According to one example, the armature is carried by the rotor assembly and the inductor windings are carried by the stator assembly.

According to a preferred embodiment, the temperature of the armature is calculated by a successive approach, the temperature value of the armature at a given time depending in particular on the temperature value of the armature calculated at the previous time, the setting and the rotational speed of the stator assembly, at the given time or at the previous time.

More precisely, to this end, the temperature calculation unit of the armature can be arranged in order to calculate the temperature of the armature according to the following formula:

$$T_R(t)=T_R(t-1)+a\times K_p\times[b\times\Omega+c\times T_R(t-1)+d\times\Omega T_R(t-1)+e\times T_R(t-1)^2]$$

in which:

$T_R(t)$ is the temperature of the armature at the given time t, $T_R(t-1)$ is the temperature of the armature at the previous time t−1, $\Omega$ is the rotational speed of the rotor assembly at the given time or at the previous time, $$b = b_1 + \frac{16 \times b_2 \times \beta}{4 + \frac{b_{var}}{16 \times \beta - 0.01}},$$

$$c = c_1 + 4 \times c_2 \times \beta,$$

$$d = d_1 + 4 \times d_2 \times \beta,$$

$$e = e_1 + 4 \times e_2 \times \beta,$$

$$K_P = 1 + (K_{P0} - 1) \times \frac{\Omega}{3000},$$

a, $b_1$, $b_2$, $b_{var}$, $c_1$, $c_2$, $d_1$, $d_2$, $e_1$, $e_2$ and $K_{P0}$ are constant coefficients, β denotes the linear supply setting, expressed as a percentage, applied to the excitation means.

Moreover, the unit for calculating the reduction factor can be arranged in order to calculate the reduction factor at a given time according to the following formula:

$$R=j\times\ln(\Omega)+k$$

in which:

$$j=j_1\times T_R(t)^4+j_2\times T_R(t)^3+j_3\times T_R(t)^2+j_4\times T_R(t)+j_5,$$

$$k=k_1\times T_R(t)^4+k_2\times T_R(t)^3+k_3\times T_R(t)^2+k_4\times T_R(t)+k_5,$$

$T_R(t)$ is the temperature of the armature calculated at the given time t, $\Omega$ is the rotational speed of the rotor assembly at the given time t or at the previous time t−1, $j_1$ to $j_5$ and $k_1$ to $k_5$ are constant coefficients.

The unit for calculating the cold torque can also be arranged in order to calculate the cold torque at a given time according to the following formula:

$$T_{cold} = \frac{\alpha}{\left[\left(\frac{\Omega}{\Omega_0}\right)^\gamma + \left(\frac{\Omega_0}{\Omega}\right)^\delta\right]}$$

in which:

$\alpha=f_1\times I_{pc}+f_2$, $\Omega_0=g_1\times I_{pc}+g_2$, $\gamma=h_1\times I_{pc}^3+h_2\times I_{pc}^2+h_3\times I_{pc}+h4$, $\Omega$ is the rotational speed of the rotor assembly at the given time t or at the previous time t−1, Where $f_1$, $f_2$, $g_1$, $g_2$, $h_1$, $h_2$, $h_3$ are constant coefficients, $I_{pc}$ is a value of the maximum strength of the current available in the inductor circuit as a function of the linear supply setting.

Finally, the unit for calculating the hot torque can thus be arranged in order to calculate the hot torque at a given time according to the following formula:

$$T_{hot}=T_{cold}\times R$$

For example, the excitation means comprise a power regulator connected on one side to the electric power source and on the other side to the inductor circuit.

According to a second aspect, the invention proposes a method for calculating, at a given time t, an actual braking torque used by eddy current retarder equipment capable to being carried on board a vehicle as mentioned above. The method comprises the following steps:

measuring the strength of the current in the inductor circuit;

measuring the rotational speed of the rotor assembly;

evaluating the temperature of the armature, as a function in particular of the rotational speed of the rotor assembly and the linear setting;

calculating a torque referred to as cold, as a function in particular of the current in the inductor circuit and the rotational speed of the rotor assembly, characteristic of an operation of the equipment without the influence of temperature;

calculating a reduction factor, as a function in particular of the rotational speed of the rotor assembly and the temperature of the armature, characteristic of the influence of temperature on the operation of the equipment;

calculating a torque referred to as hot, as a function in particular of the product of the cold torque and the reduction factor, characteristic of the actual braking torque provided by the equipment.

Other advantages relating to the invention will become apparent in the light of the description accompanied by figures in which.

Figure 2:
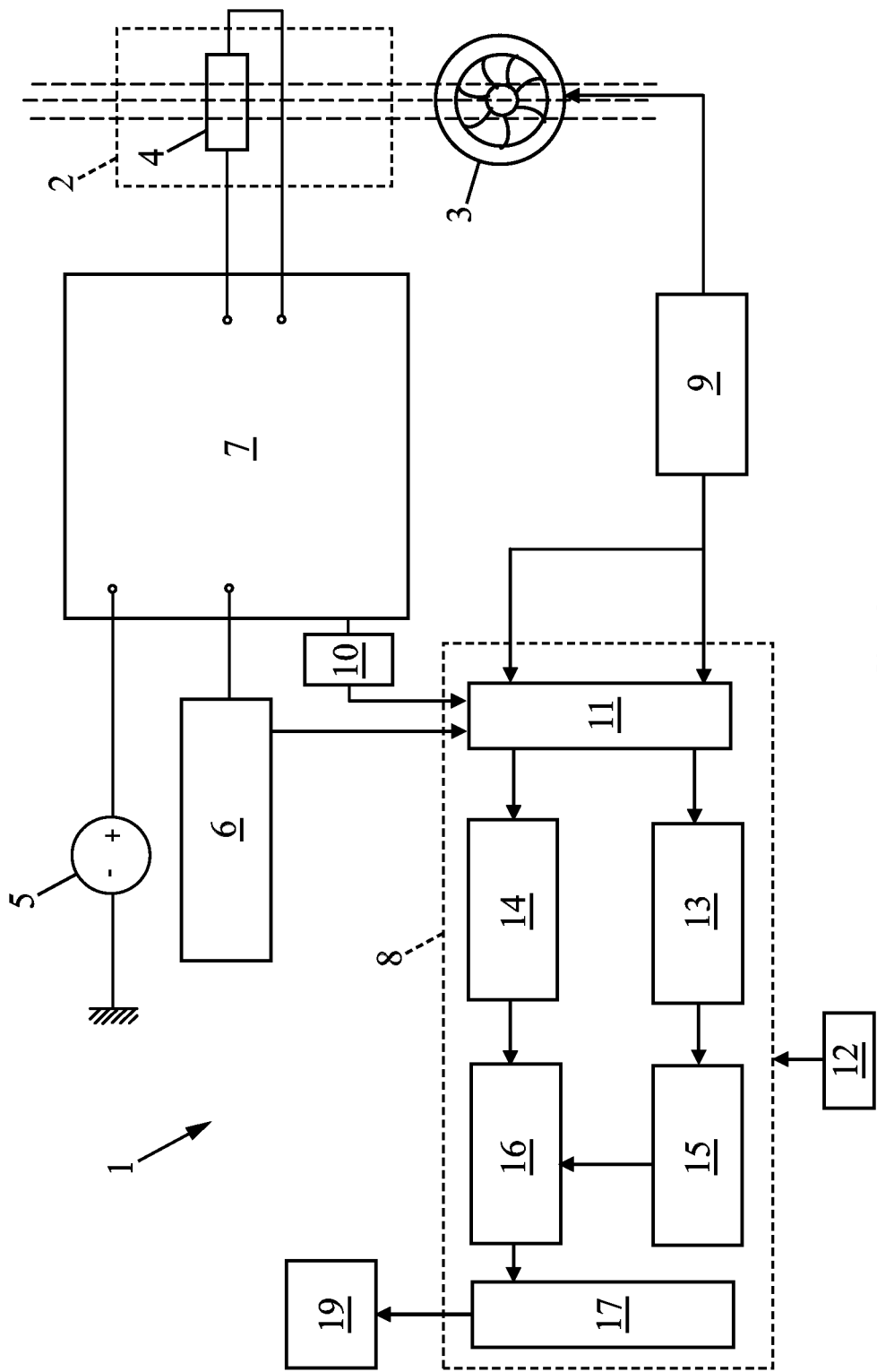
FIG. 2 is a diagrammatic representation of retarder equipment comprising the rotor assembly and the stator assembly of FIG. 1 and processing means for calculating a retarding torque.

In FIG. 2, eddy current retarder equipment 1 capable of being carried on board a vehicle, for example of the automobile type, is represented diagrammatically. The equipment 1 comprises a stator assembly 2, comprising at least one stator, and a rotor assembly 3, comprising at least one rotor. In the following, for the sake of simplicity, only the terms stator and rotor will be used with reference to the stator assembly and to the rotor assembly respectively.

One of said stator 2 and rotor 3 comprises inductor windings, such as coils, and forms an inductor circuit 4, whereas the other of said stator 2 and rotor 3 comprises an armature facing the inductor windings.

Figure 1:
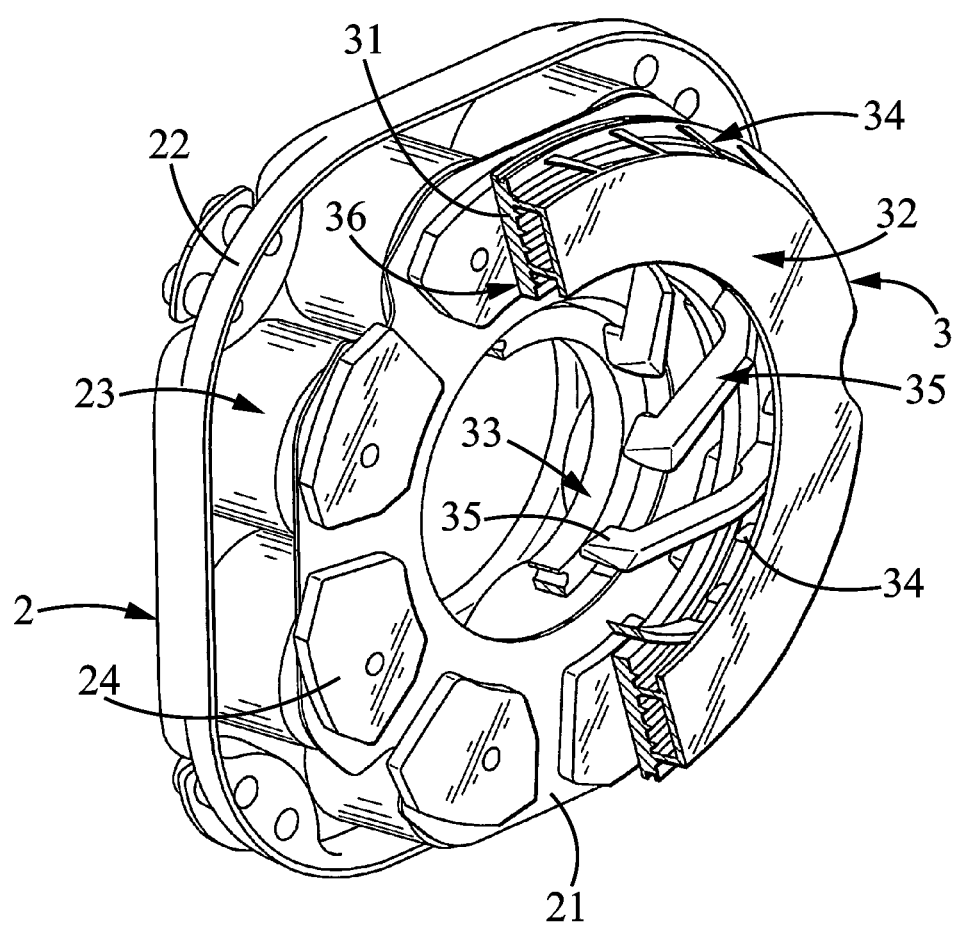
FIG. 1 is a partial perspective cross-sectional view of a rotor assembly and of a stator assembly.

In the following, the inductor circuit 4 is carried by the stator 2, and the armature by the rotor 3, as represented in FIG. 1.

The stator 2 is formed for example from two rigid plates 21, 22, between which pole assemblies 23 are angularly distributed around a central axis. Each pole assembly 23 comprises a central pole surrounded by a conducting wire, in order to form an inductor winding, or coil, axially parallel to the central axis. Each pole assembly 23 has a radial end face provided with a plate called a pole piece 24.

The rotor 3 is for example in the form of a single piece, made from ferromagnetic material, obtained by moulding. The rotor 3 comprises an armature 31 in the form of an annular disc, a side panel 32 also in the form of an annular disc of substantially similar dimensions to those of the armature 31 and a mount ring 33. Fins 34 are distributed between the side panel 32 and the armature 31 in order to dissipate the heat by conduction from the armature 31 towards the side panel 32 and by ventilation. Arms 35 connect the armature 31 to the mount ring 33.

The rotor 3 and the stator 2 are placed facing each other, the pole piece 24 of the stator 2 facing the armature 31 of the rotor 3. An air gap 36 is formed between the stator 2 and the rotor 3. The rotor 3 is for example connected in a rotationally fixed manner to a transmission shaft between the motor and the moving parts, for example the wheels of the vehicle, by fixing the mount ring 33 onto the shaft, while the stator 2 is fixed to the chassis of the vehicle.

In practice, the rotor assembly 3 comprises two rotors placed one on each side of the stator 2 along the rotational axis. In the remainder of the description, a single rotor 3 is mentioned, it being understood that the remainder of the description applies to the case comprising more than one rotor.

The inductor circuit 4 is supplied with direct current by an electric power source 5 of the vehicle. The equipment 1 thus comprises control means 6 for establishing a linear supply setting, which are connected to excitation means 7 for exciting the inductor circuit 4 as a function of the setting.

The setting is called linear, i.e. it can take an infinity of values between two extreme values. For example, it is expressed as a percentage (%) and it is denoted $\beta$ in the following. The setting $\beta$ can thus take on an infinity of values between 0%, i.e. when the equipment 1 is not used, and 100%, i.e. when the retarding torque required is at its maximum.

The control means 6 are for example an external manual or foot control unit, accessible by the driver of the vehicle from the driving position, so that the driver himself can adjust the setting $\beta$, depending on how he assesses his requirements. The control means 6 can also comprise an automatic control unit, incorporated into the onboard electronics of the vehicle, in order to automatically calculate the setting $\beta$. As a variant, the setting $\beta$ is established according to a combination of the control adjusted by the driver and the control calculated automatically. For example, the control means 6 can be incorporated into the brake pedal so that the higher the pressure exerted by the driver's foot, the higher the retarding torque required. Then, beyond a required retarding torque exceeding the capacities of the retarder equipment 1, other retarding and braking resources of the vehicle can be used.

Excitation means 7 make it possible to supply the inductor circuit 4 as a function of the setting $\beta$, and comprise for example a power regulator connected on the one hand to the electric power source 5 and on the other hand to the inductor circuit 4, as well as to the control means 6 in order to take into account the setting $\beta$.

When the setting $\beta$ is established as a function of the control, the inductor circuit 4 is supplied with current. A magnetic field proportional to the strength of the current passing through the inductor circuit 4 is thus generated. The rotor 3, driven in rotation by the transmission shaft on which it is mounted, is immersed in the magnetic field thus created and eddy currents pass through it. Forces called Laplace forces appear, counteracting their cause, namely the rotation of the shaft. Thus, a retarding torque occurs.

In order to facilitate the management of the vehicle resources, in particular of other braking resources, and optionally in order to adjust the setting $\beta$, the equipment 1 comprises processing means 8 for estimating the retarding torque provided by the equipment 1.

To this end, the equipment 1 further comprises a speed sensor 9 for providing information relating to the rotational speed $\Omega$ of the rotor 3. This can be a sensor 9 already present on the vehicle, or specific to the eddy current retarder equipment 1. The equipment 1 also comprises a current sensor 10 for measuring the strength of the current $I_{measured}$ supplying the inductor circuit 4. For example, the current sensor 10 is connected to the power regulator 7.

Processing means 8 comprise an input interface 11 connected to the speed sensor 9, to the current sensor 10 and to the control means 6, in order to collect and store information relating to the rotational speed $\Omega$ of the rotor 3, to the value of the linear setting $\beta$ and to the value of the strength of the current $I_{measured}$ supplying the inductor circuit 4.

Based on these three items of information, the processing means 8 make it possible to estimate the value of the retarding torque.

In fact, as set out in the introduction, the temperature of the armature 3 influences the retarding torque.

Moreover, the retarding torque depends on the supply current of the inductor circuit 4: the retarding torque increases with the supply current. However, it was noted that the relationship between the retarding torque and the supply current is not linear. In particular, when the supply current is high, close to its maximum value, a saturation phenomenon is observed. Furthermore, for a low supply current, for example less than 15% of its maximum value, the output, i.e. the retarding torque, is very weak. Furthermore, the retarding torque depends on the rotational speed of the rotor 3. More precisely, the relationship between the retarding torque and the supply current is modified with the rotational speed of the rotor 3.

Thus, for a given command and a setting β established as a consequence of this single command, the actual retarding torque provided by the equipment 1 may not be equal to the expected torque.

The setting β being linear, the accumulation of errors rapidly causes significant differences between the required torque and the actual torque. Errors in calculation, for example for the other items of equipment of the vehicle, ensue therefrom. These errors can also lead to the vehicle being badly driven by the driver, due to the inaccurate information at his disposal.

Thus, the characterization of the influence of these three items of information, namely the rotational speed Ω of the rotor 3, the value of the linear setting β and the value of the strength of the current $I_{measured}$ supplying the inductor circuit 4, on the retarding torque makes it possible to calculate it.

Calculation of the retarding torque is carried out at a given time t, and more precisely, it is carried out regularly, according to a determined period, for example by means of a clock 12 connected to the processing means 8, which is sufficiently short that the time between two successive calculations of the torque is invisible to the instruments of the vehicle which use this information. Thus, in practice, the calculation of the torque can be continuous.

The processing means 8 thus comprise a unit 13 for calculating the temperature of the rotor 3, and more precisely the temperature of the armature 31. In the following, the temperature of the rotor 3 and the temperature of the armature 31 are the same. The unit 13 for calculating the temperature $T_R$ of the rotor 3 is connected to the input interface 11, which provides it with information relating to the rotational speed Ω of the rotor 3, as well as to the setting β, in order to estimate the temperature $T_R(t)$ of the rotor 3 at a given time t.

It was determined that the temperature $T_R(t)$ of the rotor 3 could be determined by a successive approach, according to the following formula (1):

$$T_R(t) = T_R(t-1) + \alpha \times K_p \times [b \times \Omega + c \times T_R(t-1) + d \times \Omega \times T_R(t-1) + e \times T_R(t-1)^2] \quad (1)$$

in which:
$T_R(t)$ is the temperature of the rotor 3, or of the armature, at the given time t,
$T_R(t-1)$ is the temperature of the rotor 3, or of the armature, calculated at the previous time t−1 according to the period of the clock 12,
Ω is the rotational speed of the rotor assembly at the given time t or at the previous time, $$b = b_1 + \frac{16 \times b_2 \times \beta}{4 + \frac{b_{var}}{16 \times \beta - 0.01}},$$

$$c = c_1 + 4 \times c_2 \times \beta,$$

$$d = d_1 + 4 \times d_2 \times \beta,$$

$$e = e_1 + 4 \times e_2 \times \beta,$$

$$K_P = 1 + (K_{P0} - 1) \times \frac{\Omega}{3000},$$

a, $b_1$, $b_2$, $b_{var}$, $c_1$, $c_2$, $d_1$, $d_2$, $e_1$, $e_2$ and $K_{P0}$ are constant coefficients, β denotes, as previously, the linear supply setting, expressed as a percentage, applied to the excitation means at the given time t or at the previous time t−1 according to the cycle of the clock 12.

The coefficients are determined as a function of the type of retarder equipment 1 utilized, and in particular as a function of the characteristics of the stator 2 and of the rotor 3. They are determined for example following tests carried out on each type of equipment and recorded in a memory of the processing means 8 in order to be available to the unit 13 for calculating the temperature $T_R$ of the rotor 3 at the given time t.

The processing means 8 further comprise a unit 14 for calculating a torque $T_{cold}$, referred to as cold, showing at a given time t the maximum retarding torque that the equipment 1 could provide in the absence of the influence of the temperature of the armature. The unit 14 for calculating the cold torque $T_{cold}$ is connected to the input interface 11, which provides it with information relating to the rotational speed Ω of the rotor 3, as well as to the value of the strength of the current $I_{measured}$ supplying the inductor circuit 4. Thus, according to a calculation example, it was determined that the cold torque $T_{cold}$ can be calculated according to the following formula (2):

$$T_{cold} = \frac{\alpha}{\left[\left(\frac{\Omega}{\Omega_0}\right)^\gamma + \left(\frac{\Omega_0}{\Omega}\right)^\delta\right]} \quad (2)$$

in which:
$\alpha = f_1 \times I_{pc} + f_2$,
$\Omega_0 = g_1 \times I_{pc} + g_2$,
$\gamma = h_1 \times I_{pc}^3 + h_2 \times I_{pc}^2 + h_3 \times I_{pc} + h_4$,
Ω is the rotational speed of the rotor assembly 3 at the given time t or at the previous time t−1,
$f_1$, $f_2$, $g_1$, $g_2$, $h_1$, $h_2$, $h_3$ are constant coefficients,
$I_{pc}$ is a value of the maximum strength of the current available in the inductor circuit as a function of the linear supply setting β.

The constant coefficients are determined in this case, as previously, for example by tests, and stored in a memory in order to be available to the unit 14 for calculating the cold torque $T_{cold}$ at the given time t.

The value $I_{pc}$ of the maximum strength of the current available in the inductor circuit 4 is based on the measurement by the current sensor 10 of the strength provided by the excitation means 7 to the inductor circuit 4 during the activation of the retarder equipment 1, as a function of the setting β and is expressed as a percentage (%).

For example, when the retarder equipment 1 is not activated, the setting β is equal to 0%. In this case, the value $I_{pc}$ of the maximum strength of the current available is set as equal to 85%.

When the equipment 1 is activated, the setting β is greater than 0%, and the value $I_{pc}$ of the maximum strength of the available current is determined as a function of the value of the strength $I_{measured}$ measured by the current sensor 10, of a reference value $I_{ref}$, which is the maximum strength of current capable of supplying the inductor circuit 4. For example, the value $I_{pc}$ of the maximum strength of the current available in the inductor circuit 4 is calculated according to the following formula:

$$I_{pc} = \text{Min}[100; I_{avail}]$$

for $$\beta \neq 0$$

with $$I_{avail} = \frac{I_{measured}}{I_{Ref}} \times \frac{100}{\beta}.$$

The cold torque $T_{cold}$ does not make it possible to take into account the influence of temperature on the actual retarding torque. Thus, in other words, the cold torque $T_{cold}$ makes it possible to characterize the operation of the retarder equipment 1 without the influence of temperature. The processing means 8 comprise a unit 15 for calculating a reduction factor R, quantitatively representing the influence of temperature of the rotor 3. The unit 15 for calculating the reduction factor R is connected to the unit 13 for calculating the temperature $T_R$ of the rotor, as well as to the input interface 11, which supplies it with information on the rotational speed Ω of the rotor 3. According to a calculation example, it was determined that the reduction factor R can be calculated according to the following formula (3):

$$R = j \times \ln(\Omega) + k \quad (3)$$

in which:

$$j = j_1 \times T_R(t)^4 + j_2 \times T_R(t)^3 + j_3 \times T_R(t)^2 + j_4 \times T_R(t) + j_5,$$

$$k = k_1 \times T_R(t)^4 + k_2 \times T_R(t)^3 + k_3 \times T_R(t)^2 + k_4 \times T_R(t) + k_5,$$

$T_R(t)$ is the temperature of the armature calculated at the given time t by means of the calculation unit 13 of the armature 31, Ω is, as previously, the rotational speed of the rotor assembly 3 at the given time t or at the previous time t−1, $j_1$ to $j_5$ and $k_1$ to $k_5$ are constant coefficients.

The constant coefficients are still determined in this case, as previously, by tests depending on the type of the retarder equipment 1 and stored in a memory in order to be available to the unit 15 for calculating the reduction factor R at the given time t.

The reduction factor R thus characterizes the influence of temperature on the retarder equipment 1.

Finally, the processing means 8 comprise a unit 16 for calculating the torque $T_{hot}$ referred to as hot, as a function of the cold torque $T_{cold}$ and the reduction factor R. For example, the hot torque $T_{hot}$ can be calculated according to the following formula:

$$T_{hot} = T_{cold} \times R \quad (4)$$

The hot torque $T_{hot}$ provides a reliable estimation of the actual retarding torque provided by the retarder equipment 1 at the given time t, as a function of the linear setting β.

The value of the hot torque $T_{hot}$ can be supplied to an output interface 17 of the processing means 8, which output interface 17 can record the values of the hot torque $T_{hot}$ over a determined period of time for a subsequent analysis of the performance of the retarder equipment 1. The output interface 17 can also be connected to a braking management device 19 of the vehicle, in order to activate other braking resources of the vehicle accordingly. It can also be taken into account in order to establish the setting β and to correct the difference between the controlled torque and the hot torque $T_{hot}$.

The retarder equipment 1 thus described makes it possible to obtain a reliable estimation of the actual retarding torque by calculating the torque $T_{hot}$ taking into account the influence of the temperature $T_R$ of the armature and of the linear setting β. The calculation errors are thus greatly reduced.

Figure 3:
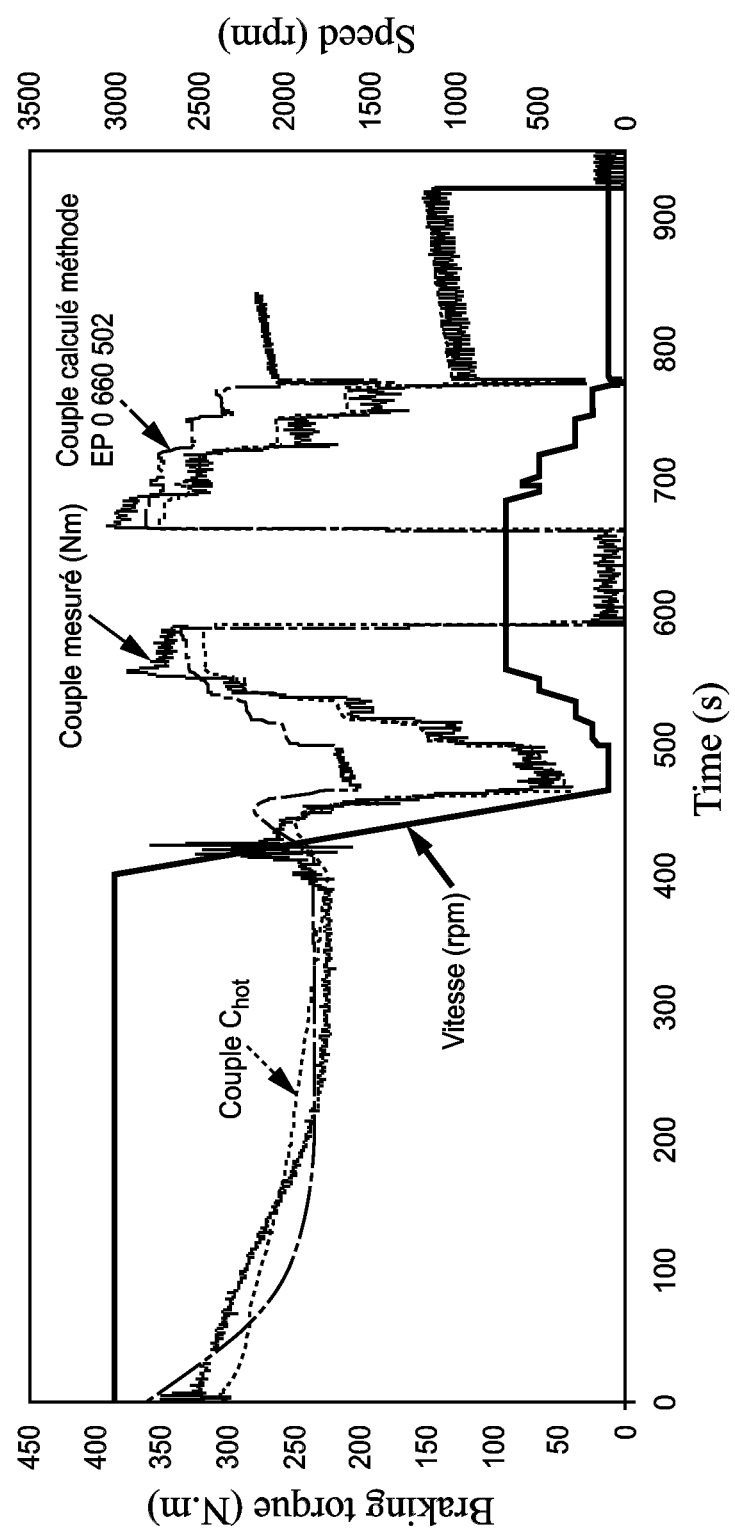
FIG. 3 is a diagram illustrating the evolution of the measured torque, of the torque obtained by means of the old approach according to document EP 0 660 502 and the torque obtained by means of the novel approach disclosed here as a function of time, as well as the rotational speed of the rotor as a function of time.

FIG. 3 compares the actual i.e. measured, retarding torque, to the torque obtained by means of a calculation according to the old approach of the state of the art, for example that disclosed in the document EP 0 660 502, as well as to the torque $T_{hot}$, obtained by means of the method disclosed in the present application. The new calculation model making it possible to calculate the hot torque $T_{hot}$ reduces the calculation errors in comparison to the torque obtained by the old method, in particular when the rotational speed of the rotor 3 decreases. The accuracy of the retarding torque obtained by the new approach is thus clearly increased in comparison to the old approach.

The invention claimed is:

1. Eddy current retarder equipment (1) capable of being carried on board a vehicle, comprising:
    a stator assembly (2),
    a rotor assembly (3) capable of being mounted on a transmission shaft of the vehicle,
    one of said stator assembly (2) and rotor assembly (3) comprising inductor windings (23) forming an inductor circuit (4) and the other of said stator assembly (2) and rotor assembly (3) comprising an armature (31) facing the inductor windings (23),
    the equipment (1) further comprising:
        control means (6) for establishing a linear setting (β),
        excitation means (7) for exciting the inductor circuit (4) from an electric power source (5) of the vehicle as a function of the setting (β),
        a speed sensor (9) for providing information relating to the rotational speed (Ω) of the rotor assembly (3),
        a sensor (10) of the strength of current supplying the inductor circuit (4),
        processing means (8) for estimating at a given time (t) the retarding torque provided by the equipment (1),
    the processing means (8) comprising a unit (13) for calculating temperature capable of evaluating the temperature ($T_R$) of the armature (31), as a function in particular of the rotational speed (Ω) of the rotor assembly (3) and of the linear setting (β),
    wherein the processing means further comprise:
        a torque calculation unit (14) for calculating a torque ($T_{cold}$) referred to as cold, as a function in particular of the current ($I_{measured}$) in the inductor circuit (4) and the rotational speed (Ω) of the rotor assembly (3), characteristic of an operation of the equipment without the influence of temperature;
        a unit (15) for calculating a reduction factor (R), as a function in particular of the rotational speed (Ω) of the rotor assembly (3) and the temperature ($T_R$) of the armature (31), characteristic of the influence of temperature on the operation of the equipment;
        a unit (16) for calculating a torque ($T_{hot}$) referred to as hot, as a function in particular of the product of the cold torque ($T_{cold}$) and the reduction factor (R), characteristic of the actual retarding torque provided by the equipment.

2. Equipment (1) according to claim 1, in which the control means (6) comprise a manual or foot control device capable of adopting an infinity of positions between two extreme positions.

3. Equipment (1) according to claim 2, in which the control means (6) comprise an electronic control unit.

4. Equipment (1) according to claim 2, in which the armature (31) is carried by the rotor assembly (3) and the inductor windings (23) are carried by the stator assembly (2).

5. Equipment (1) according to claim 2, in which the temperature ($T_R$) of the armature (31) is calculated by a successive approach, the value of the temperature ($T_R$) of the armature (31) at a given time depending in particular on the value of the temperature ($T_R$) of the armature (31) calculated at the previous time (t−1), the setting (β) and the rotational speed (Ω) of the stator assembly (2) at the given time (t) or at the previous time (t−1).

6. Equipment (1) according to claim 5, in which the unit (13) for calculating the temperature ($T_R$) of the armature (31) is arranged in order to calculate the temperature ($T_R$) of the armature according to the following formula:

$$T_R(t)=T_R(t-1)+\alpha\times K_p\times[b\times\Omega+c\times T_R(t-1)+d\times\Omega\times T_R(t-1)+e\times T_R(t-1)^2]$$

in which:
$T_R(t)$ is the temperature of the armature at the given time t,
$T_R(t-1)$ is the temperature of the armature at the previous time t−1,
Ω is the rotational speed of the rotor assembly at the given time or at the previous time, $$b = b_1 + \frac{16\times b_2\times\beta}{4+\frac{b_{var}}{16\times\beta-0.01}},$$

$$c = c_1 + 4\times c_2\times\beta,$$

$$d = d_1 + 4\times d_2\times\beta,$$

$$e = e_1 + 4\times e_2\times\beta,$$

$$K_P = 1 + (K_{P0}-1)\times\frac{\Omega}{3000},$$

a, $b_1$, $b_2$, $b_{var}$, $c_1$, $c_2$, $d_1$, $d_2$, $e_1$, $e_2$ and $K_{P0}$ are constant coefficients,
β denotes the linear supply setting, expressed as a percentage, applied to the excitation means.

7. Equipment (1) according to claim 2, in which the excitation means (7) comprise a power regulator connected on the one hand to the power source (5) and on the other hand to the inductor circuit (4).

8. Equipment (1) according to claim 1, in which the control means (6) comprise an electronic control unit.

9. Equipment (1) according to claim 8, in which the armature (31) is carried by the rotor assembly (3) and the inductor windings (23) are carried by the stator assembly (2).

10. Equipment (1) according to claim 1, in which the armature (31) is carried by the rotor assembly (3) and the inductor windings (23) are carried by the stator assembly (2).

11. Equipment (1) according to claim 1, in which the temperature ($T_R$) of the armature (31) is calculated by a successive approach, the value of the temperature ($T_R$) of the armature (31) at a given time depending in particular on the value of the temperature ($T_R$) of the armature (31) calculated at the previous time (t−1), the setting (β) and the rotational speed (Ω) of the stator assembly (2) at the given time (t) or at the previous time (t−1).

12. Equipment (1) according to claim 11, in which the unit (13) for calculating the temperature ($T_R$) of the armature (31) is arranged in order to calculate the temperature ($T_R$) of the armature according to the following formula:

$$T_R(t)=T_R(t-1)+\alpha\times K_p\times[b\times\Omega+c\times T_R(t-1)+d\times\Omega T_R(t-1)+e\times T_R(t-1)^2]$$

in which:
$T_R(t)$ is the temperature of the armature at the given time t,
$T_R(t-1)$ is the temperature of the armature at the previous time t−1,
Ω is the rotational speed of the rotor assembly at the given time or at the previous time, $$b = b_1 + \frac{16\times b_2\times\beta}{4+\frac{b_{var}}{16\times\beta-0.01}},$$

$$c = c_1 + 4\times c_2\times\beta,$$

$$d = d_1 + 4\times d_2\times\beta,$$

$$e = e_1 + 4\times e_2\times\beta,$$

$$K_P = 1 + (K_{P0}-1)\times\frac{\Omega}{3000},$$

a, $b_1$, $b_2$, $b_{var}$, $c_1$, $c_2$, $d_1$, $d_2$, $e_1$, $e_2$ and $K_{P0}$ are constant coefficients,
β denotes the linear supply setting, expressed as a percentage, applied to the excitation means.

13. Equipment (1) according to claim 12, in which the unit (15) for calculating the reduction factor (R) is arranged in order to calculate the reduction factor (R) at a given time (t) according to the following formula:

$$R=j\times\ln(\Omega)+k$$

in which:

$$j=j_1\times T_R(t)^4+j_2\times T_R(t)^3+j_3\times T_R(t)^2+j_4\times T_R(t)+j_5,$$

$$k=k_1\times T_R(t)^4+k_2\times T_R(t)^3+k_3\times T_R(t)^2+k_4\times T_R(t)+k_5,$$

$T_R(t)$ is the temperature of the armature calculated at the given time t,
Ω is the rotational speed of the rotor assembly at the given time t or at the previous time t−1,
$j_1$ to $j_5$ and $k_1$ to $k_5$ are constant coefficients.

14. Equipment (1) according to claim 11, in which the unit (15) for calculating the reduction factor (R) is arranged in order to calculate the reduction factor (R) at a given time (t) according to the following formula:

$$R=j\times\ln(\Omega)+k$$

in which:

$$j=j_1\times T_R(t)^4+j_2\times T_R(t)^3+j_3\times T_R(t)^2+j_4\times T_R(t)+j_5,$$

$$k=k_1\times T_R(t)^4+k_2\times T_R(t)^3+k_3\times T_R(t)^2+k_4\times T_R(t)+k_5,$$

$T_R(t)$ is the temperature of the armature calculated at the given time t,
Ω is the rotational speed of the rotor assembly at the given time t or at the previous time t−1,
$j_1$ to $j_5$ and $k_1$ to $k_5$ are constant coefficients.

15. Equipment (1) according to claim 14, in which the unit (14) for calculating the cold torque is arranged in order to calculate the cold torque at a given time (t) according to the following formula:

$$T_{cold} = \frac{\alpha}{\left[\left(\frac{\Omega}{\Omega_0}\right)^\gamma + \left(\frac{\Omega_0}{\Omega}\right)^\delta\right]}$$

in which:
$\alpha = f_1 \times I_{pc} + f_2$,
$\Omega_0 = g_1 \times I_{pc} + g_2$,
$\gamma = h_1 \times I_{pc}^3 + h_2 \times I_{pc}^2 + h_3 \times I_{pc} + h4$,
$\Omega$ is the rotational speed of the rotor assembly at the given time t or at the previous time t−1,
Where
$f_1$, $f_2$, $g_1$, $g_2$, $h_1$, $h_2$, $h_3$ are constant coefficients,
$I_{pc}$ is a value of the maximum strength of the current available in the inductor circuit (4) as a function of the linear supply setting ($\beta$).

16. Equipment (1) according to claim 15, in which the unit (16) for calculating the hot torque ($T_{hot}$) is arranged in order to calculate the hot torque ($T_{hot}$) at a given time (t) according to the following formula:

$T_{hot} = T_{cold} \times R$.

17. Equipment (1) according to claim 11, in which the unit (14) for calculating the cold torque is arranged in order to calculate the cold torque at a given time (t) according to the following formula:

$$T_{cold} = \frac{\alpha}{\left[\left(\frac{\Omega}{\Omega_0}\right)^\gamma + \left(\frac{\Omega_0}{\Omega}\right)^\delta\right]}$$

in which:
$\alpha = f_1 \times I_{pc} + f_2$,
$\Omega_0 = g_1 \times I_{pc} + g_2$,
$\gamma = h_1 \times I_{pc}^3 + h_2 \times I_{pc}^2 + h_3 \times I_{pc} + h4$,
$\Omega$ is the rotational speed of the rotor assembly at the given time t or at the previous time t−1,
where
$f_1$, $f_2$, $g_1$, $g_2$, $h_1$, $h_2$, $h_3$ are constant coefficients,
$I_{pc}$ is a value of the maximum strength of the current available in the inductor circuit (4) as a function of the linear supply setting ($\beta$).

18. Equipment (1) according to claim 1, in which the excitation means (7) comprise a power regulator connected on the one hand to the power source (5) and on the other hand to the inductor circuit (4).

19. Method for calculating, at a given time (t), an actual braking torque used by an eddy current retarder equipment (1) capable of being carried on board a vehicle according to claim 1, comprising the following steps:
- measuring the strength of the current ($I_{measured}$) in the inductor circuit (4);
- measuring the rotational speed ($\Omega$) of the rotor assembly (3);
- evaluating the temperature of the armature, as a function in particular of the rotational speed ($\Omega$) of the rotor assembly (3) and the linear setting ($\beta$);
- calculating a torque ($T_{cold}$) referred to as cold, as a function in particular of the current ($I_{measured}$) in the inductor circuit (4) and of the rotational speed ($\Omega$) of the rotor assembly (3), characteristic of an operation of the equipment without the influence of temperature;
- calculating a reduction factor (R), as a function in particular of the rotational speed ($\Omega$) of the rotor assembly (3) and of the temperature ($T_R$) of the armature (31), characteristic of the influence of temperature on the operation of the equipment;
- calculating a torque ($T_{hot}$) referred to as hot as a function in particular of the product of the cold torque ($T_{cold}$) and the reduction factor (R), characteristic of the actual braking torque provided by the equipment.

* * * * *